United States Patent [19]
Hirano et al.

[11] Patent Number: 5,099,285
[45] Date of Patent: Mar. 24, 1992

[54] DEVELOPMENT ROLLER WITH SURFACE LAYER OF FLUOROSILICON POLYMER

[75] Inventors: Yasuo Hirano; Jun Aoto, both of Numazu, Japan

[73] Assignee: Ricoh Company, Ltd., Tokyo, Japan

[21] Appl. No.: 538,020

[22] Filed: Jun. 13, 1990

[30] Foreign Application Priority Data

Jun. 16, 1989 [JP] Japan ........................... 1-153785
Jun. 16, 1989 [JP] Japan ........................... 1-153786
Nov. 14, 1989 [JP] Japan ........................... 1-295764

[51] Int. Cl.$^5$ ........................................... G03G 15/06
[52] U.S. Cl. ...................................... 355/245; 118/653; 355/259
[58] Field of Search ............... 355/245, 251, 256, 259; 118/651, 653, 661, 657, 658; 29/132; 430/120

[56] References Cited

U.S. PATENT DOCUMENTS

| | | | |
|---|---|---|---|
| 4,637,973 | 1/1987 | Shigeta et al. | 118/657 X |
| 4,827,868 | 5/1989 | Tarumi et al. | 355/259 X |
| 4,910,556 | 3/1990 | Namiki | 355/245 |
| 4,958,193 | 9/1990 | Nojima et al. | 355/259 |

FOREIGN PATENT DOCUMENTS

| | | | |
|---|---|---|---|
| 1293370 | 11/1989 | Japan | 355/245 |
| 2105182 | 4/1990 | Japan | 355/245 |
| 2108081 | 4/1990 | Japan | 355/245 |
| 2110585 | 4/1990 | Japan | 355/245 |

*Primary Examiner*—A. T. Grimley
*Assistant Examiner*—William J. Royer
*Attorney, Agent, or Firm*—Cooper & Dunham

[57] ABSTRACT

A development apparatus including a development roller for developing a latent electrostatic image formed on an electrophotographic photoconductor to a visible toner image by applying a non-magnetic one-component toner thereto, in which a surface layer of the development roller includes a fluorosilcone polymer including repeating units of formula (I):

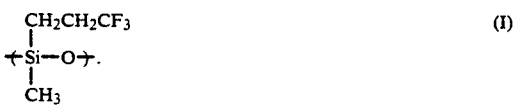

29 Claims, 5 Drawing Sheets

DEVELOPMENT ROLLER WITH SURFACE LAYER OF FLUOROSILICON POLYMER

BACKGROUND OF THE INVENTION

1. Field of the Invention

The present invention relates to a development apparatus for developing latent electrostatic images to visible toner images, and more particularly to a development apparatus including a development roller with a surface layer comprising a trifluoropropyl-group-containing fluorosilicone polymer.

2. Discussion of the Background

Conventionally, there is known a method of developing latent electrostatic images by a non-magnetic one-component toner, in which method the toner is supplied onto a development roller and formed into a thin layer by a toner layer thickness regulation means such as a blade-shaped member or roller-shaped member, and the thus formed toner layer is then brought into contact with a latent electrostatic image formed on an electrophotographic photoconductor, whereby the latent electrostatic image is developed to a visible toner image.

In the aforementioned development method, it is generally necessary that the development roller meet the following requirements:

(1) The surface layer of the development roller has such a low hardness that a sufficiently large contact area can be obtained between the development roller and the photoconductor. For instance, it is made of a material with a degree of hardness ranging from 30 to 40 in accordance with JIS K 6301 (JIS A).

(2) The material for the surface layer of the development roller has appropriate electric properties to achieve excellent development performance. In the case where the surface layer is made of a rubber, with a thickness of several millimeters, the rubber layer has a volume resistivity of $10^8$ to $10^{12}$ $\Omega \cdot cm$.

(3) The aforementioned hardness and electric properties do not change depending upon the environmental conditions, in particular, by the ambient temperature and humidity.

Conventionally, nitril-butadiene rubber (NBR), epichlorohydrin rubber (ECO), urethane rubber, acrylic rubber and chloroprene rubber are used as the materials for the surface layer of the development roller. These conventional rubber materials can satisfy the above-mentioned requirements (1) and (2), but do not satisfy the requirement (3). In particular, the electric properties considerably vary depending on the changes in temperature and humidity.

SUMMARY OF THE INVENTION

Accordingly, an object of the present invention is to provide a development apparatus including a development roller for developing a latent electrostatic image formed on an electrophotographic photoconductor to a visible toner image by applying a non-magnetic one-component toner thereto, which development roller has such excellent environmental resistance that the development performance thereof is scarcely deteriorated even when the ambient temperature and humidity are changed.

The above-mentioned object of the present invention can be achieved by a development apparatus including a development roller which comprises a surface layer comprising a fluorosilicone polymer including repeating units of formula (I):

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

In a development apparatus according to the present invention, a development roller comprises a surface layer which comprises a fluorosilicone polymer including repeating units of formula (I):

In addition, the above-mentioned surface layer of the development roller may further comprise a fluorine-containing surface active agent.

The above-mentioned fluorosilicone polymer containing a trifluoropropyl group is highly resistant to heat and humidity. In addition, this fluorosilicone polymer has a small volume resistivity because of the polar effect of the trifluoropropyl group contained in the polymer. Furthermore, the hardness of the fluorosilicone polymer can be decreased by controlling the crosslinking density thereof in order to obtain a sufficiently large contact area between the development roller and the photoconductor.

Thus, the development roller including a surface layer which comprises the trifluoropropyl-group-containing fluorosilicone polymer is superior to the conventional rollers because it has excellent environmental resistance, that is, its properties such as hardness and electrical properties hardly change depending upon changes in the environmental conditions such as temperature and humidity.

From the viewpoint of the superiority in the environmental resistance, the development roller of the development apparatus according to the present invention will now be explained in detail.

Figure 2A:
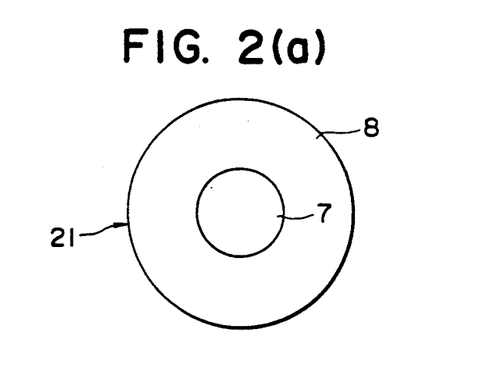
FIGS. 2(a) to 2(d) are schematic cross-sectional views of development rollers according to the present invention.

To evaluate the environmental resistance of the development roller, five types of development rollers were prepared in such a fashion as illustrated in FIG.

2(a), by coating the respective rubbers with a thickness of 6 mm as shown in Table 1 on a metallic core.

In an environmental resistance test, the volume resistivity of each development roller was measured in the following manner under the conditions of high temperature and high humidity (30° C., 80% RH) and low temperature and low humidity (10° C., 20% RH).

Measurement of Volume Resistivity of Development Roller

A 2.5-cm-wide copper foil strip was wound around the surface layer of each development roller including a metallic core. This copper foil strip was used as a main electrode. The metallic core was used as a counter electrode. Two copper foil strips which were the same as mentioned above were wound around the surface layer of the development roller, with a space of 1 mm from the opposite sides of the main electrode copper foil strip and grounded. These copper foil strips were used as guard electrodes. By use of a commercially available high resistance meter, "4329A" (Trademark), made by Yokogawa-Hewlett-Packard, Ltd., with the application of a direct current of 100 V to electrodes, the volume resistivity of the above development roller was measured and calculated in accordance with the following formula:

$$\text{Volume Resistivity } (\Omega \cdot \text{cm}) = R' \times \frac{2\pi l}{\ln(b/a)}$$

In the above formula, R' is the value read by the high resistance meter; l, the width (2.5 cm) of the main electrode; a, the diameter (8 mm) of the metallic core serving as the counter electrode; and b, the diameter (20 mm) of the development roller.

The results are shown in Table 1.

TABLE 1

| Rubber for Surface Layer | Volume Resistivity ($\Omega \cdot$ cm) | |
|---|---|---|
| of Development Roller | 10° C.; 20% RH | 30° C.; 80% RH |
| Fluorosilicone polymer (1) | $4.0 \times 10^{11}$ | $3.9 \times 10^{10}$ |
| Fluorosilicone polymer (2) | $7.5 \times 10^{11}$ | $6.5 \times 10^{10}$ |
| NBR (3) | $3.1 \times 10^{9}$ | $1.5 \times 10^{11}$ |
| Hydrogenated NBR (4) | $4.3 \times 10^{12}$ | $4.3 \times 10^{10}$ |
| Urethane resin (5) | $3.5 \times 10^{9}$ | $2.1 \times 10^{12}$ |

| | |
|---|---|
| Fluorosilicone polymer (1) | "LS63U" (Trademark), made by Toray Silicone Co., Ltd. |

(Fluorosilicone polymer: 100 mol %)

| | |
|---|---|
| Fluorosilicone polymer (2) | "DY37-036U" (Trademark), made by Toray Silicone Co., Ltd. |

(Fluorosilicone polymer: 100 mol %)

| | |
|---|---|
| NBR (3) | "220S" (Trademark), made by Nippon Zeon Co., Ltd. |
| Hydrogenated NBR (4) | "Zetpol 1020" (Trademark), made by Nippon Zeon Co., Ltd. |
| Urethane resin (5) | "ODX-106" (Trademark), made by Hokushin Kogyo Co., Ltd. |

As is apparent from the results shown in Table 1, it is confirmed that the fluorosilicone polymers (1) and (2) for use in the present invention surpass the other resin materials in the environmental resistance.

The surface layer of the development roller according to the present invention comprises as the main component the above-mentioned fluorosilicone polymer. Furthermore, to adjust the electric and mechanical characteristics and to control the cost of the materials, conventional silicone polymers such as dimethyl silicone polymer, methylvinyl silicone polymer and phenyl silicone polymer may be used in combination with the above flurorsilicone polymer. In this case, it is preferable that the above conventional silicone polymers be contained in an amount of 10 parts by weight or less to 90 parts by weight of the fluorosilicone polymer, to make the best use of the characteristics of the fluorosilicone polymer for use in the present invention.

As previously mentioned, the fluorosilicone polymer which contains a trifluoropropyl group has a small volume resistivity and shows superiority in the environmental resistance. In the present invention, a fluorine-containing surface active agent may be added to the above fluorosilicone polymer, so that the volume resistivity is further decreased and the environmental resistance is further improved.

To assess the volume resistivity which depends on the environmental conditions when the fluorine-containing surface active agent is added to the fluorosilicone polymer for use in the present invention, an environmental resistance test was performed. In the environmental resistance test, the volume resistivity of each development roller was measured in the same manner as mentioned previously under the conditions of high temperature and high humidity (30° C., 80 % RH) and low temperature and low humidity (10° C., 20 % RH).

Each development roller was prepared in such a fashion as illustrated in FIG. 2(a), by coating a mixture of 100 parts by weight of the commercially available fluorosilicone polymer (1), "LS63U" (Trademark), made by Toray Silicone Co., Ltd., and a commercially available fluorine-containing surface active agent, "Unidyne DS401" (Trademark), made by Daikin Industries, Ltd., with a thickness of 6 mm on a metallic core. The amount of the fluorine-containing surface active agent was changed as shown in Table 2.

The results of the environmental resistance test are shown in Table 2.

TABLE 2

| Amount of Fluorine-containing Surface Active | Volume Resistivity ($\Omega \cdot$ cm) | |
|---|---|---|
| Agent | 10° C.; 20% RH | 30° C.; 80% RH |
| Nil | $4.0 \times 10^{11}$ | $3.9 \times 10^{10}$ |
| 1 part by weight | $1.3 \times 10^{10}$ | $2.9 \times 10^{9}$ |
| 3 parts by weight | $2.8 \times 10^{9}$ | $8.0 \times 10^{8}$ |
| 5 parts by weight | $6.1 \times 10^{8}$ | $2.2 \times 10^{8}$ |
| 10 parts by weight | $3.5 \times 10^{8}$ | $9.6 \times 10^{7}$ |
| 12 parts by weight (*) | $3.1 \times 10^{8}$ | $8.8 \times 10^{7}$ |

(*) The fluorine-containing surface-active agent oozed to the surface of the development roller.

As can be seen from the results shown in Table 2, the surface layers of the development rollers which comprise a mixture of the above-mentioned fluorosilicone polymer and fluorine-containing surface active agent have a relatively small volume resistivity and show improved environmental resistance as compared with the surface layer of the development roller which contains the fluorosilicone polymer only.

As the fluorine-containing surface active agents for use in the present invention, nonionic, cationic, anionic or ampholytic surface active agents can be employed as far as they comprise a fluorine compound including a fluoroalkyl group. Particularly, nonionic surface active agents are preferable in the present invention.

The fluorine compound in the fluorine-containing surface active agents for use in the present invention are represented by the following formulas:

$$C_nF_{2n+1}OH \quad (II)$$

(III)

(IV)

wherein n is an integer of 4 to 16; and $R^1$ is an alkyl group having 1 to 5 carbon atoms.

As the commercially available above-mentioned fluorine-containing surface active agents, "Surflon" (Trademark), made by Asahi Glass Co., Ltd., "Megafac" (Trademark), made by Dainippon Ink & Chemicals, Incorporated, "Eftop" (Trademark), made by Tohkem Products Corporation, "Ftergent" (Trademark), made by NEOS Co., Ltd., and "Unidyne" (Trademark), made by Daikin Industries, Ltd., can be employed in the practical use.

In the surface layer of the development roller according to the present invention, the content of the above fluorine-containing surface active agent is not specifically limited, but preferably in the range from 0.1 to 10 parts by weight, and more preferably from 1 to 5 parts by weight, to 100 parts by weight of the fluorosilicone polymer.

When the amount of the fluorine-containing surface active agent is within the above range, not only the volume resistivity of the surface layer of the development roller is efficiently decreased, but also the environmental resistance can be sufficiently improved. Furthermore, the surface layer of the development roller does not become tacky and the surface active agent does not ooze to the surface of the surface layer of the development roller.

In the present invention, the volume resistivity of the surface layer of the development roller can be further decreased and the environmental resistance thereof can be further improved when an alkylene-oxide-addition fluorine compound is employed as the aforementioned fluorine-containing surface active agent.

The above-mentioned alkylene-oxide-addition fluorine compounds are, for example, those represented by the following formulas:

$$C_nF_{2n+1}O(R^1O)_mH \quad (V)$$

wherein n is an integer of 4 to 16; m is an integer of 2 to 30; and $R^1$ is an alkylene group having 1 to 5 carbon atoms;

(VI)

wherein n is an integer of 4 to 16; m is an integer of 2 to 30; $R^1$ is an alkylene group having 1 to 5 carbon atoms; and $R^2$ is an alkyl group having 1 to 5 carbon atoms; and (VII)

wherein n is an integer of 4 to 16; m is an integer of 2 to 30; $R^1$ is an alkylene group having 1 to 5 carbon atoms; and $R^2$ is an alkyl group having 1 to 5 carbon atoms.

As the moiety of the alkylene oxide of the aforementioned alkylene-oxide-addition fluorine compound, ethylene oxide and propylene oxide moieties are preferable, and in particular, the former is more preferable than the latter, and both straight-chain and a branched-chain perfluoroalkyls may be employed as the perfluoroalkyl moiety.

In the surface layer of the development roller according to the present invention, it is preferable that the content of the above alkylene-oxide-addition fluorine compound be in the range from 0.1 to 10 parts by weight, and more preferably from 1 to 5 parts by weight, to 100 parts by weight of the fluorosilicone polymer.

Depending on the number of the moles of added alkylene oxide, the volume resistivity of the surface active agent varies. In addition, the compatibility of the surface active agent with the fluorosilicone rubber or a mixture of the fluorosilicone rubber and other synthetic rubbers also varies, which will affect the volume resistivity of the obtained surface layer of the development roller.

To assess the relationship between the number of the moles of added alkylene oxide in the fluorine-containing surface active agent, and the volume resistivity of the obtained surface active agent and the compatibility of the surface active agent with a fluorosilicone polymer, a nonionio fluorine-containing surface active agent, perfluoroalkyl octalene sulfonamide ethyl polyoxyethylene represented by the following formula, was used in the measurement, with the average number of the moles of added ethylene oxide (m in formula VIII) being changed to 2, 3, 10, 20 and 40.

Perfluoroalkyl octalene sulfonamide ethyl polyoxyethylene (VIII)

The volume resistivity of the above surface active agent was measured in such a manner that the surface active agent was poured into a cell in which two sheet electrodes were located 1 cm apart from each other in parallel and an electric field of 100 volts DC was applied thereto. The volume resistivity of the surface active agent was measured by "601C Electrometer" (made by Keithley Co., Ltd.) and calculated in accordance with the following formula:

$$\text{Volume Resistivity } (\Omega \cdot cm) = R' \times \frac{S}{t}$$

in which R' indicates a value read in the measurement; S indicates an area of each electrode (cm$^2$); and t indicates the distance between the two electrodes (cm).

The compatibility of the above surface active agent with the fluorosilicone polymer was then evaluated in such a manner that a mixture of 1 part by weight of the above-prepared surface active agent and 100 parts by weight of a commercially available fluorosilicone oil, "FS-1265" Trademark), made by Toray Silicone Co., Ltd., was vigorously stirred and allowed to stand for a while, and the clarity of the thus prepared mixed solution was visually inspected.

The results are given in Table 3.

TABLE 3

| | Average Number of Moles of Added Ethylene Oxide [m in formula (VIII)] | | | | |
|---|---|---|---|---|---|
| | m = 2 | m = 3 | m = 10 | m = 20 | m = 40 |
| Volume Resistivity ($\Omega \cdot$ cm) | $1.9 \times 10^5$ | $2.2 \times 10^5$ | $1.8 \times 10^5$ | $3.2 \times 10^6$ | $1.1 \times 10^7$ |
| Compatibility | semi-transparent | semi-transparent | slightly white opaque | slightly white opaque | white opaque |

It can be seen from the results shown in Table 3 that the smaller the average number of the moles of the added ethylene oxide in the surface active agent, the smaller the volume resistivity thereof and the better the compatibility with the fluorosilicone polymer. The following components were mixed to prepare a polymer composition which contains each of the above prepared nonionic fluorine-containing surface active agents comprising an alkylene-oxide-addition fluorine compound:

Polymer Composition

| | Parts by Weight |
|---|---|
| Fluorosilicone polymer containing a trifluoropropyl group ["DY37-036U" (Trademark), made by Toray Silicone Co., Ltd.] | 100 |
| Dry-type silica "Aerosil 200" (Trademark), made by Nippon Aerosil Co., Ltd. | 25 |
| Methylvinyl silicone raw rubber | 50 |
| Crosslinking agent "RC-4" (Trademark), made by Toray Silicone Co., Ltd. | 1.5 |
| The above-prepared nonionic fluorine-containing surface active agent | 1.5 |

The thus obtained polymer composition containing the nonionic fluorine-containing surface active agent was cured at 170° C. for 10 minutes under application of a pressure of 120 kg/cm² and formed into a rubber sheet having a thickness of 2 mm by press molding.

The surface appearance of the thus obtained rubber sheet was visually inspected and the volume resistivity thereof was measured at 30° C. and 80 % RH, and at 10° C. and 20% RH. The results are shown in Table 4.

TABLE 4

| | Average Number of Moles of Added Ethylene Oxide [m in formula (VIII)] | | | | |
|---|---|---|---|---|---|
| | m = 2 | m = 3 | m = 10 | m = 20 | m = 40 |
| Surface Appearance | expanded | good | good | good | expanded |
| Volume Resistivity ($\Omega \cdot$ cm) [30° C./80% RH] | $6.2 \times 10^{10}$ | $2.1 \times 10^9$ | $1.8 \times 10^9$ | $2.5 \times 10^9$ | $8.8 \times 10^{10}$ |
| Volume Resistivity ($\Omega \cdot$ cm) [10° C./20% RH] | $1.2 \times 10^{10}$ | $8.5 \times 10^9$ | $8.0 \times 10^9$ | $9.5 \times 10^9$ | $4.8 \times 10^{10}$ |

The results shown in Table 4 indicate that the average number of the moles of the added alkylene oxide contained in the fluorine-containing surface active agent is preferably in the range of 3 to 20, and more preferably in the range of 5 to 15. When the average number of the moles of the added alkylene oxide is in the range of 3 to 20, no bubbles were observed at the surface of the obtained rubber sheet. This is because a heat decomposition point of the surface active agent is not extremely lowered, and at the same time, the compatibility of the surface active agent with the fluorosilicone polymer is not decreased. In addition, the volume resistivity of the surface active agent is not decreased at high temperatures and humidities, which will lead to the improvement in the environmental resistance. On the other hand, when the average number of the moles of the added alkylene oxide is 2 or 40, the surface was expanded with the formation of bubbles.

In the present invention, other components such as an inorganic filler, a crosslinking agent and a thermal stabilizer may be added to the composition of the surface layer of the development roller for their respective purposes.

Examples of the inorganic filler for use in the present invention are diatomaceous earth; ground quartz; finely-divided particles of iron oxide, zinc oxide, titanium oxide, calcium oxide, magnesium oxide, talc, aluminum silicate and aluminum oxide; fibers of potassium titanate, asbestos, glass and carbon; and finely-divided particles of Teflon and boron nitride.

The above-mentioned inorganic fillers for use in the present invention may be surface-treated by use of a silane coupling agent, a titanate coupling agent, a zircoaluminate coupling agent, various surface active agents and organic polymers to improve the moisture resistance.

Examples of the crosslinking agent for use in the present invention are peroxides such as 2,5-dimethyl-2,5-bis(t-butyl peroxy)hexane, benzoyl peroxide and dicumyl peroxide.

Examples of the thermal stabilizer for use in the present invention are red oxide and barium zirconate.

The development apparatus according to the present invention will now be explained in detail with reference to FIG. 1.

Figure 1:
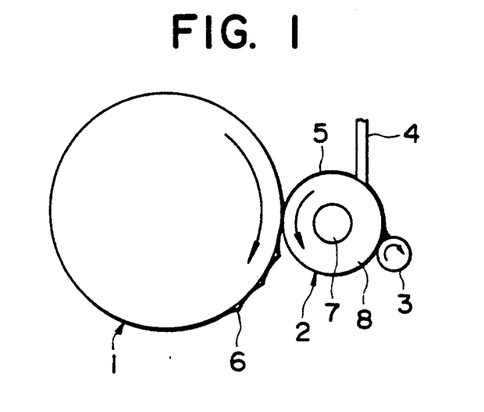
FIG. 1 is a schematic diagram of a development apparatus according to the present invention.

In FIG. 1, a non-magnetic one-component toner contained in a container (not indicated in FIG. 1) is transported to a developer supply roller 3 and then onto a surface layer 8 of a development roller 2 comprising a core member 7 and the surface layer 8 formed thereon. The toner is spread on the surface layer 8 of the development roller 2 by means of a toner layer thickness regulation means 4 to form a thin toner layer 5 with a uniform thickness and a predetermined electric charge quantity. The thin toner layer 5 is then carried into a development zone where the development roller 2 comes into contact with a photoconductor 1 which bears latent electrostatic images, so that the toner is electrostatically attracted to the latent electrostatic images formed on the photoconductor 1 and deposited thereon. Thus, the latent electrostatic images are developed to visible toner images 6.

FIGS. 2(a) through 2(d) are schematic cross-sectional views of the development rollers according to the present invention.

In FIG. 2(a), a development roller 21 is composed of a core member 7 and a surface layer 8, formed thereon, comprising a fluorosilicone polymer. The development roller of this kind can be prepared by conventional methods. For example, press molding, extrusion, steam molding and injection molding methods can be used in the case where a millable fluorosilicone polymer is used for the formation of the surface layer 8. When a liquid-type fluorosilicone polymer is employed for the surface layer 8, injection molding and cast molding processes can be employed.

Figure 2B:
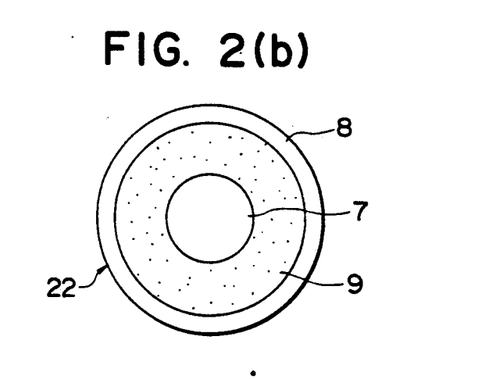

In FIG. 2(b), a development roller 22 is composed of a core member 7, an electroconductive elastic layer 9 and a surface layer 8 comprising a fluorosilicone polymer, which two layers are successively formed on the core member 7. For the electroconductive elastic layer 9, an elastic material having a volume resistivity of $10^7$ $\Omega.cm$ or less is employed. More specifically, rubber materials such as silicone rubber and ethylene-propylene-diene-methylene (EPDM) linkage rubber in which electroconductive particles, such as carbon black are dispersed are preferably used for the electroconductive elastic layer 9. The electroconductive elastic layer 9 and surface layer 8 comprising the fluorosilicone polymer can be prepared by the above-mentioned molding methods. In addition, a silane coupling agent, for example, commercially available "A-4040", made by Dow-Corning Corporation, may be coated as a primer on the electroconductive elastic layer 9 to improve the adhesion strength between the two layers.

Figure 2C:
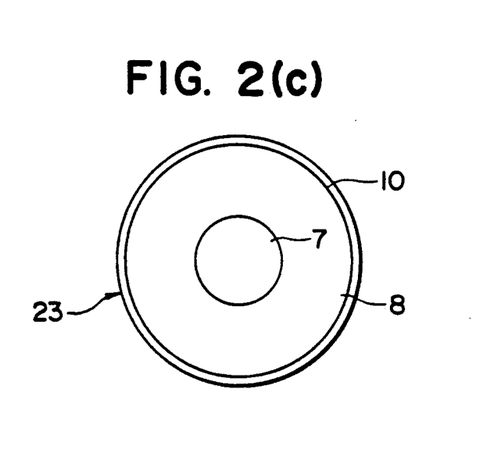

In FIG. 2(c), a development roller 23 is composed of a core member 7, a surface layer 8 comprising a fluorosilicone polymer and an outer layer 10 to improve at least one of the surface properties such as a capability of charging the toner, releasability of the toner from the development roller, lubricating properties and wear-resistant properties.

Figure 2D:
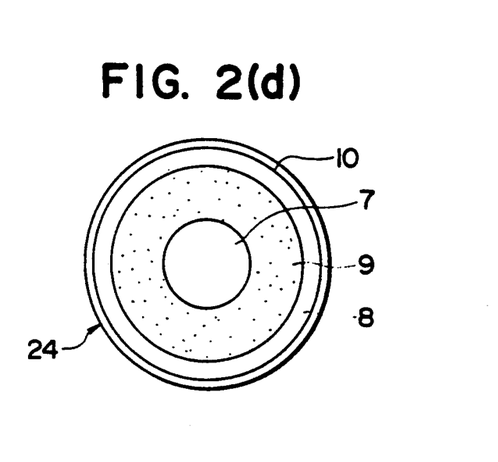

In FIG. 2(d), a development roller 24 is composed of a core member 7, an electroconductive elastic layer 9, a surface layer 8 comprising a fluorosilicone polymer and an outer layer 10, which three layers are successively coated on the core member 7.

Examples of the material for the above-mentioned outer layer 10, as shown in FIGS. 2(c) and 2(d), are vinyl resins such as polyvinyl chloride, polyvinyl butyral, polyvinyl alcohol, polyvinylidene chloride, polyvinyl acetate and polyvinyl formal; polystyrene resins such as polystyrene, styrene - acrylonitrile copolymer and acrylonitrile -butadiene - styrene copolymer; polyethylene resins such as polyethylene and ethylene - vinyl acetate copolymer; acrylic resins such as polymethyl methacrylate and polymethyl methacrylate - styrene copolymer; and other resins such as polyacetal, polyamide, cellulose, polycarbonate, phenoxy resin, polyester, fluoroplastic, polyurethane, phenolic resin, urea resin, melamine resin, epoxy resin, unsaturated polyester resin and silicone resin.

To further improve the development performance, finely-divided particles of metals such as aluminum, nickel and copper; inorganic electroconductive particles of carbon, tin oxide and zinc oxide; or the above-mentioned finely-divided particles which have been surface-treated by a resin may be dispersed in the outer layer 10.

As previously mentioned, the development apparatus according to the present invention shows stable development performance even when the ambient temperature and humidity are changed. Therefore, the development apparatus according to the present invention is superior to conventional ones in the environmental resistance, and practically useful.

Other features of this invention will become apparent in the course of the following description of exemplary embodiments, which are given for illustration of the invention and are not intended to be limiting thereof.

EXAMPLE 1

A commercially available primer, "A4040" (Trademark), made by Dow-Corning Corporation, was applied to a 14-mm diameter metallic core which has been cleaned by a commercially available trichloroethylene, "Trichlene" (Trademark), made by Toagosei Chemical Industry Co., Ltd.

The following components were mixed to prepare a fluorosilicone polymer composition:

Formulation of Fluorosilicone Polymer Composition

|  | Parts by Weight |
| --- | --- |
| Fluorosilicone polymer containing a trifluoropropyl group ["DY37-036U" (Trademark), made by Toray Silicone Co., Ltd.] | 100 |
| Crosslinking agent ["RC-4" (Trademark), made by Toray Silicone Co., Ltd.] | 1 |

The thus prepared fluorosilicone polymer composition was applied to the above-mentioned metallic core and formed into a surface layer by the press molding at 170° C. for 10 minutes with application of a pressure of 120 kg/cm². Then the above development roller was allowed to stand at 200° C. for 4 hours, whereby a surface layer with a thickness of 20 mm was formed on the metallic core as shown in FIG. 2(a). Thus, a development roller No. 1 according to the present invention was obtained.

The thus obtained development roller was incorporated in a development apparatus as shown in FIG. 1, in which other parts employed were as follows:

Toner layer thickness regulation means (4):

A silicone rubber blade having a thickness of 1 mm.

Developer supply roller (3):

An electroconductive sponge roller.

Using an organic photoconductor negatively charged under application of $-800$ V, a development performance test was carried out. In this test, a negatively charged toner with the following formulation was employed:

|  | Parts by Weight |
|---|---|
| Styrene-acrylic resin copolymer | 100 |
| Carbon | 10 |
| Chromium-containing monoazo dye (particle diameter: 12 μm) | 2 |

In the development performance test, the electric charge quantity of the toner was measured by a blow-off method at high temperature (30° C.) and high humidity (80% RH) and at low temperature (10° C.) and low humidity (20% RH). The results are shown in Table 5.

Figure 3:
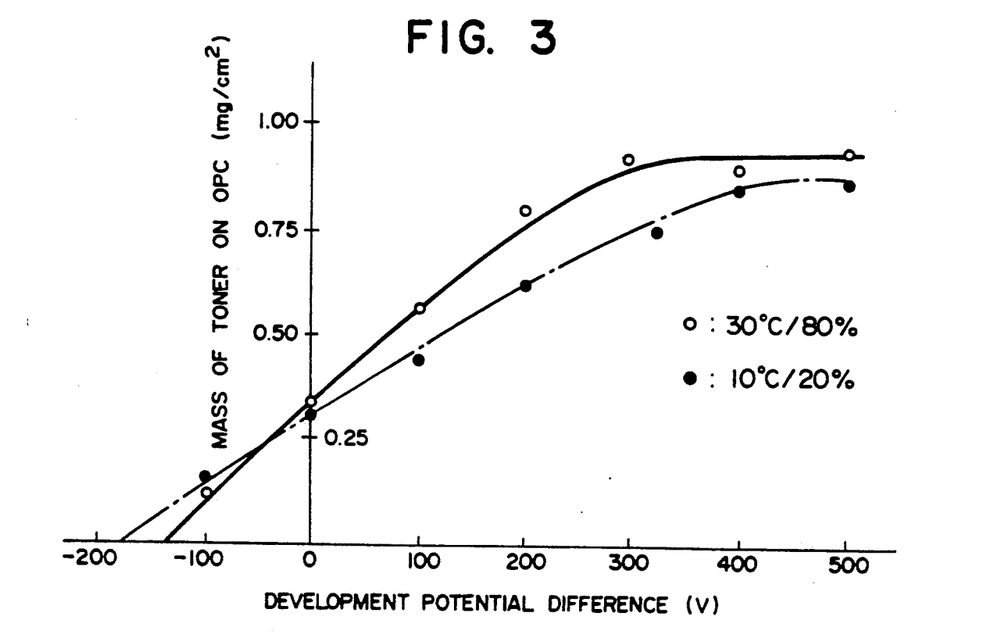
FIGS. 3 to 9 are graphs showing the environmental resistance of a development apparatus according to the present invention.

Subsequently, the toner deposited on the surface of the organic photoconductor was transferred to a tape and the amount of the transferred toner was measured, with the potential difference between the organic photoconductor and the development roller being changed (M-V characteristics). This measurement was also carried out at high temperature (30° C.) and high humidity (80% RH) and at low temperature (10° C.) and low humidity (20% RH). The results are shown in FIG. 3.

EXAMPLE 2

A commercially available electroconductive primer, "DY39-011" (Trademark), made by Toray Silicone Co., Ltd., was applied to a 6-mm diameter metallic core.

The following components were mixed and kneaded in a two-roll mill:

|  | Parts by Weight |
|---|---|
| Methylvinyl polysiloxane | 100 |
| Carbon ["Ketjen Black EC" (Trademark), made by Lion.Akzo Co., Ltd.] | 5 |
| Quartz | 20 |

1.5 parts by weight of a commercially available crosslinking agent, 2,4-dimethyl-2,4-di-ter-butylperoxyhexane, "RC-4" (Trademark), made by Toray Silicone Co., Ltd., was added to 100 parts by weight of the above prepared mixture, so that an electroconductive elastic composition was prepared. The thus prepared electroconductive elastic composition was applied to the above-mentioned metallic core and formed into a layer by the press molding at 170° C. for 10 minutes with application of a pressure of 120 kg/cm². The above layer was allowed to stand at 200° C. for 4 hours, whereby an electroconductive elastic layer with a thickness of 4 mm was formed on the metallic core. The thus formed electroconductive elastic layer had a volume resistivity of $1.5 \times 10^5$ Ω.cm and a hardness of 28° in accordance with JIS K 6301 (JIS A).

The following components were mixed to prepare a fluorosilicone polymer composition:

Formulation of Fluorosilicone Polymer Composition

|  | Parts by Weight |
|---|---|
| Fluorosilicone rubber ["LS63u" (Trademark), made by Toray Silicone Co., Ltd.] | 100 |
| Methylvinyl polysiloxane raw rubber | 100 |
| Crosslinking agent ["RC-4" (Trademark), made by Toray Silicone Co., Ltd.] | 2 |

The thus prepared fluorosilicone polymer composition was applied to the above-prepared electroconductive elastic layer and steam-cured, so that a surface layer comprising the fluorosilicone polymer having a thickness of 1 mm was formed around the electroconductive elastic layer as shown in FIG. 2(b). Thus, a development roller No. 2 according to the present invention was obtained.

Figure 4:
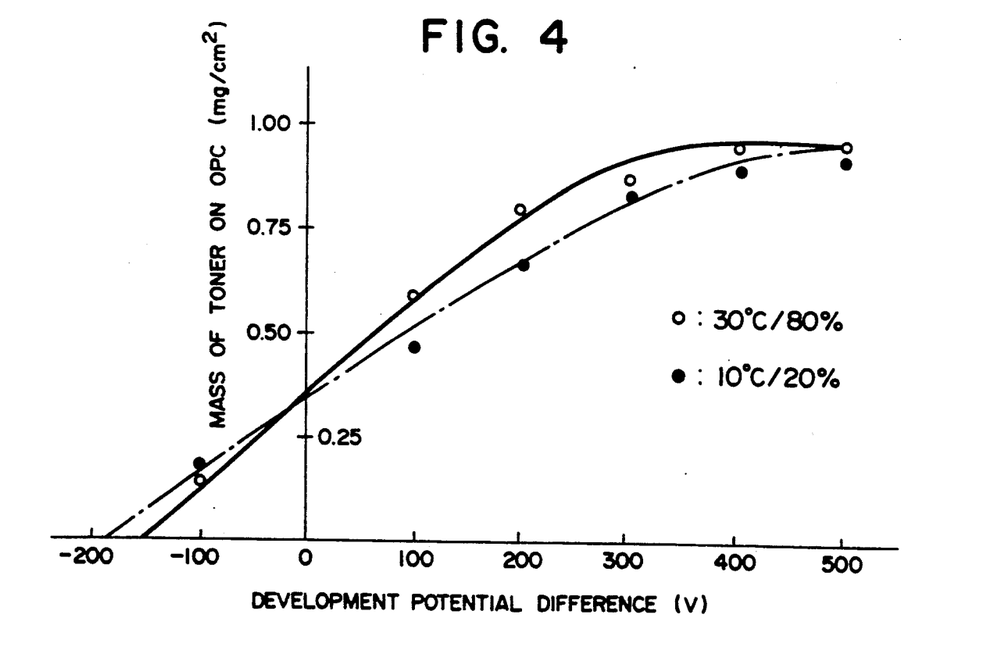

Using the above prepared development roller, the electric charge quantities of the toner were measured and the M-V characteristics were evaluated in the development performance test in the same manner as in Example 1. The results are shown in Table 5 and FIG. 4.

EXAMPLE 3

A commercially available primer, "A4040" (Trademark), made by Dow-Corning Corporation, was applied to a 14-mm diameter metallic core which has been cleaned by a commercially available trichloroethylene, "Trichlene" (Trademark), made by Toagosei Chemical Industry Co., Ltd.

The following components were mixed to prepare a fluorosilicone polymer composition:

Formulation of Fluorosilicone Polymer Composition

|  | Parts by Weight |
|---|---|
| Fluorosilicone polymer containing a trifluoropropyl group ["DY37-036U" (Trademark), made by Toray Silicone Co., Ltd.] | 100 |
| Crosslinking agent ["RC-4" (Trademark), made by Toray Silicone Co., Ltd.] | 1 |

The thus prepared fluorosilicone polymer composition was applied to the above-mentioned metallic core and formed into a surface layer by the press molding at 170° C. for 10 minutes with application of a pressure of 120 kg/cm². Then the above surface layer was allowed to stand at 200° C. for 4 hours, whereby a surface layer with a thickness of 20 mm was formed on the metallic core.

The surface of the above-prepared surface layer was cleaned by a commercially available trichloroethylene, "Trichlene", made by Toagosei Chemical Industry Co., Ltd. A 1% xylene solution of a commercially available titanate-type coupling agent, "TA-25" (Trademark), made by Matsumoto Seiyaku Kogyo Co., Ltd., was then applied to the above surface layer and dried for 30 minutes.

The following components were mixed to prepare an outer layer coating liquid:

|  | Parts by Weight |
| --- | --- |
| Fluorine-containing copolymer resin ["Lumifron 601C" (Trademark), made by Asahi Glass Co., Ltd.] (Solid content: 50%) | 100 |
| Adhesive ["Coronate EH" (Trademark), made by Nippon Polyurethane Industry Co., Ltd.] (Solid content: 50%) | 20 |
| Acrylic coating aluminum paste ["Fz1260" (Trademark), made by Toyo Aluminum K. K.] | 5 |
| Toluene | 200 |
| Xylene | 200 |

The thus prepared outer layer coating liquid was coated on the above-prepared surface layer by spray coating and cured at 100° C. for 1 hour, so that an outer layer having a thickness of 2 μm was formed around the surface layer comprising the fluorosilicone polymer as shown in FIG. 2(c). Thus, a development roller No. 4 according to the present invention was obtained.

Figure 5:
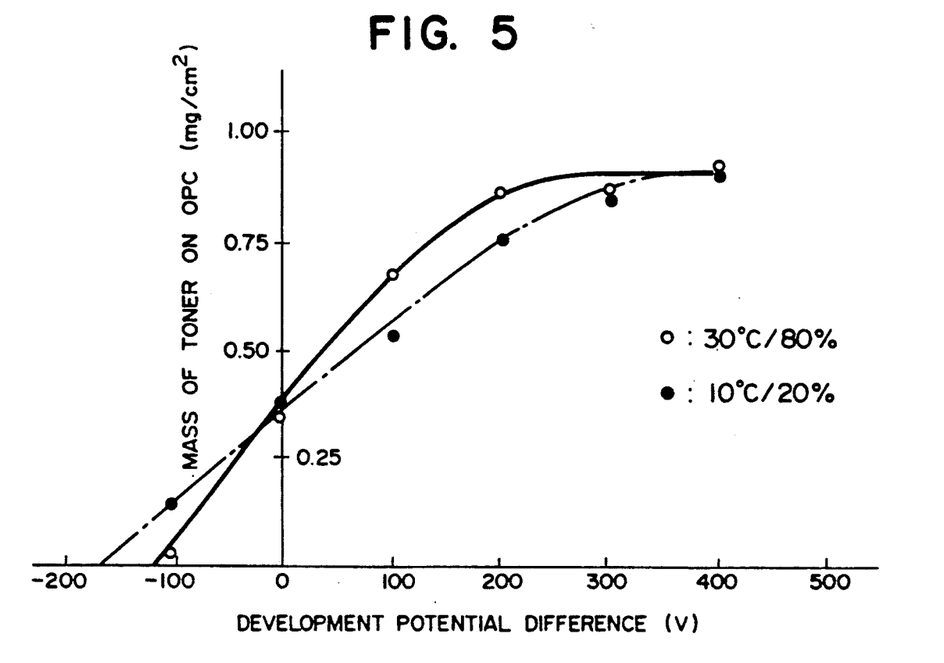

Using the above prepared development roller, the electric charge quantities of the toner were measured and the M-V characteristics were evaluated in the development performance test in the same manner as in Example 1. The results are shown in Table 5 and FIG. 5.

EXAMPLE 4

A commercially available electroconductive primer, "DY39-011" (Trademark), made by Toray Silicone Co., Ltd., was applied to a 6-mm diameter metallic core.

The following components were mixed and kneaded in a two-roll mill:

|  | Parts by Weight |
| --- | --- |
| Methylvinyl polysiloxane | 100 |
| Carbon ["Ketjen Black EC" (Trademark), made by Lion.Akzo Co., Ltd.] | 5 |
| Quartz | 20 |

1.5 parts by weight of a commercially available crosslinking agent, 2,4-dimethyl-2,4-di-ter-butylperoxyhexane, "RC-4" (Trademark), made by Toray Silicone Co., Ltd., was added to 100 parts by weight of the above prepared mixture, so that an electroconductive elastic composition was prepared. The thus prepared electroconductive elastic composition was applied to the above-mentioned metallic core and formed into a layer by the press molding at 170° C. for 10 minutes with application of a pressure of 120 kg/cm². The above layer was allowed to stand at 200° C. for 4 hours, whereby an electroconductive elastic layer with a thickness of 4 mm was formed on the metallic core. The thus formed electroconductive elastic layer had a volume resistivity of $1.5 \times 10^5$ Ω.cm and a hardness of 28° in accordance with JIS K 6301 (JIS A).

The following components were mixed to prepare a fluorosilicone polymer composition:

Formulation of Fluorosilicone Polymer Composition

|  | Parts by Weight |
| --- | --- |
| Fluorosilicone rubber ["LS63u" (Trademark), made by Toray Silicone Co., Ltd.] | 100 |
| Methyvinyl polysiloxane raw rubber | 100 |
| Crosslinking agent ["RC-4" (Trademark), made by Toray Silicone Co., Ltd.] | 2 |

The thus prepared fluorosilicone polymer composition was applied to the above-prepared electroconductive elastic layer and steam-cured, so that a surface layer comprising the fluorosilicone polymer having a thickness of 1 mm was formed around the electroconductive elastic layer.

The surface of the above-prepared surface layer was cleaned by a commercially available trichloroethylene, "Trichlene" (Trademark), made by Toagosei Chemical Industry Co., Ltd. A 1% xylene solution of a commercially available titanate-type coupling agent, "TA-25" (Trademark), made by Matsumoto Seiyaku Kogyo Co., Ltd., was applied to the above surface layer and dried for 30 minutes.

The following components were mixed to prepare an outer layer coating liquid:

|  | Parts by Weight |
| --- | --- |
| Fluorine-containing copolymer resin ["Lumifron 601C" (Trademark), made by Asahi Glass Co., Ltd.] (Solid content: 50%) | 100 |
| Adhesive ["Coronate EH" (Trademark), made by Nippon Polyurethane Industry Co., Ltd.] (Solid content: 50%) | 20 |
| Acrylic coating aluminum paste ["Fz1260" (Trademark), made by Toyo Aluminum K. K.] | 5 |
| Toluene | 200 |
| Xylene | 200 |

The thus prepared outer layer coating liquid was coated on the above-prepared surface layer by spray coating and cured at 100° C. for 1 hour, so that an outer layer having a thickness of 2 μm was formed around the surface layer as shown in FIG. 2(d). Thus, a development roller No. 4 according to the present invention was obtained.

Figure 6:
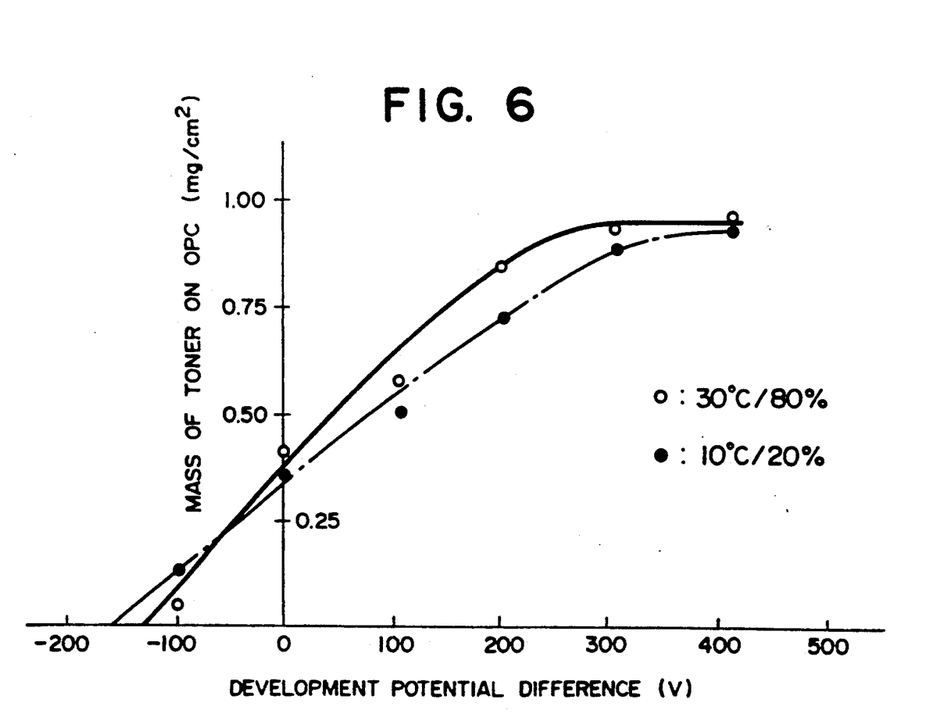

Using the above prepared development roller, the electric charge quantities of the toner were measured and the M-V characteristics were evaluated in the development performance test in the same manner as in Example 1. The results are shown in Table 5 and FIG. 6.

EXAMPLE 5

A commercially available primer, "A4040" (Trademark), made by Dow-Corning Corporation, was applied to an 8-mm diameter metallic core which has been cleaned by a commercially available trichloroethylene, "Trichlene" (Trademark), made by Toagosei Chemical Industry Co., Ltd.

The following components were mixed to prepare a fluorosilicone polymer composition:

Formulation of Fluorosilicone Polymer Composition

|  | Parts by Weight |
| --- | --- |
| Fluorosilicone polymer containing a trifluoropropyl group ["DY37-036U" (Trademark), made by Toray Silicone Co., Ltd.] | 100 |
| Methylvinyl silicone raw rubber | 100 |
| Fluorine-containing surface active agent ["Surflon S-381" (Trademark), made by Asahi Glass Co., Ltd.] | 0.3 |
| Crosslinking agent ["RC-4" (Trademark), made by Toray Silicone Co., Ltd.] | 1 |

The thus prepared fluorosilicone polymer composition was applied to the above-mentioned metallic core and formed into a surface layer by the press molding at 115° C. for 10 minutes with application of a pressure of 120 kg/cm$^2$. Then the above development roller was allowed to stand at 200° C. for 4 hours, whereby a surface layer with a thickness of 20 mm was formed on the metallic core as shown in FIG. 2(a). Thus, a development roller No. 5 according to the present invention was obtained.

Figure 7:
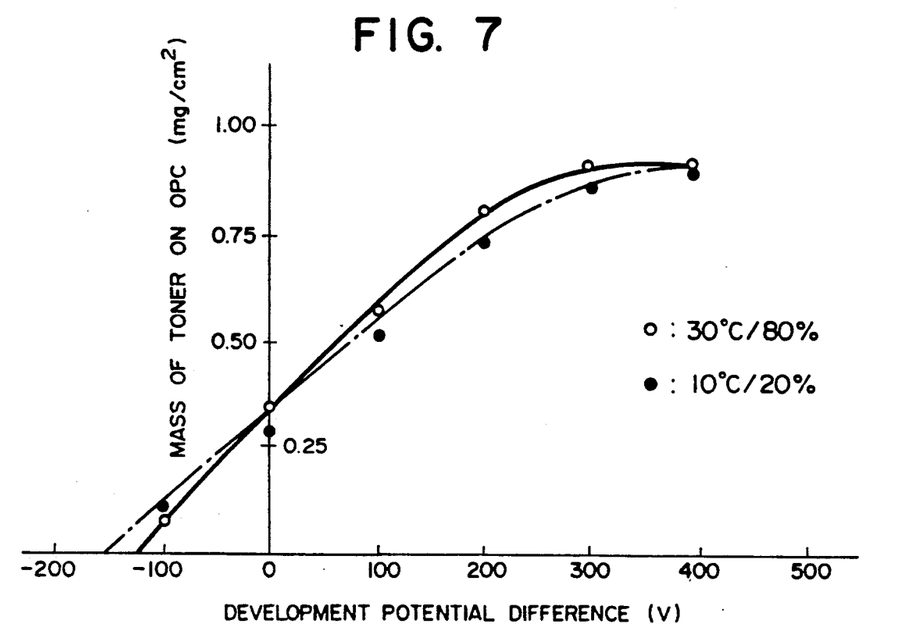

Using the above prepared development roller, the electric charge quantities of the toner were measured and the M-V characteristics were evaluated in the development performance test in the same manner as in Example 1. The results are shown in Table 5 and FIG. 7.

EXAMPLE 6

A commercially available primer, "DY39-011" (Trademark), made by Toray Silicone Co., Ltd., was applied to an 8-mm diameter metallic core (SUS304) which has been cleaned by a commercially available trichloroethylene, "Trichlene" (Trademark), made by Toagosei Chemical Industry Co., Ltd.

The following components were mixed to prepare a fluorosilicone polymer composition:

Formulation of Fluorosilicone Polymer Composition

|  | Parts by Weight |
| --- | --- |
| Fluorosilicone polymer containing a trifluoropropyl group | 100 |
| Dry-type silica "Aerosil 200" (Trademark), made by Nippon Aerosil Co., Ltd. | 200 |
| Crosslinking agent "RC-4" (Trademark), made by Toray Silicone Co., Ltd. | 3 |
| $C_8F_{17}SO_2N(C_2H_5){-}(CH_2CH_2O)_{\overline{10}}{-}H$ | 3 |

The thus prepared fluorosilicone polymer composition was applied to the above-mentioned metallic core and formed into a surface layer by the press molding at 170° C. for 10 minutes with application of a pressure of 120 kg/cm$^2$, whereby a surface layer with a thickness of 6 mm was formed on the metallic core as shown in FIG. 2(a). Thus, a development roller No. 6 according to the present invention was obtained.

Figure 8:
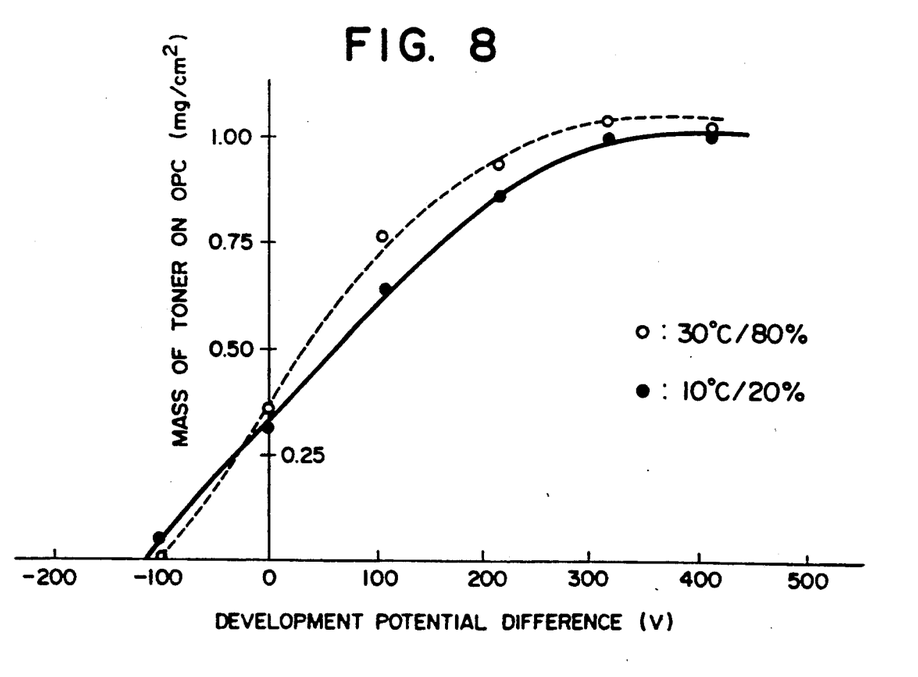

Using the above prepared development roller, the electric charge quantities of the toner were measured and the M-V characteristics were evaluated in the development performance test in the same manner as in Example 1. The results are shown in Table 5 and FIG. 8.

EXAMPLE 7

A commercially available primer, "DY39-011" (Trademark), made by Toray Silicone Co., Ltd., was applied to an 8-mm diameter metallic core (SUS304) which has been cleaned by a commercially available trichloroethylene, "Trichlene" (Trademark), made by Toagosei Chemical Industry Co., Ltd.

The following components were mixed to prepare a fluorosilicone polymer composition:

Formulation of Fluorosilicone Polymer Composition

|  | Parts by Weight |
| --- | --- |
| Fluorosilicone polymer containing a trifluoropropyl group | 100 |
| Dry-type silica "Aerosil 200" (Trademark), made by Nippon Aerosil Co., Ltd. | 25 |
| Methylvinyl silicone raw rubber | 50 |
| Crosslinking agent "RC-4" (Trademark), made by Toray Silicone Co., Ltd. | 1.5 |
| $C_8F_{17}SO_2N(C_2H_5){-}(CH_2CH_2O)_{\overline{10}}{-}H$ | 1.5 |

The thus prepared fluorosilicone polymer composition was applied to the above-mentioned metallic core and formed into a surface layer by the press molding at 170° C. for 10 minutes with application of a pressure of 120 kg/cm$^2$, whereby a surface layer with a thickness of 6 mm was formed on the metallic core as shown in FIG. 2(a). Thus, a development roller No. 7 according to the present invention was obtained.

Figure 9:
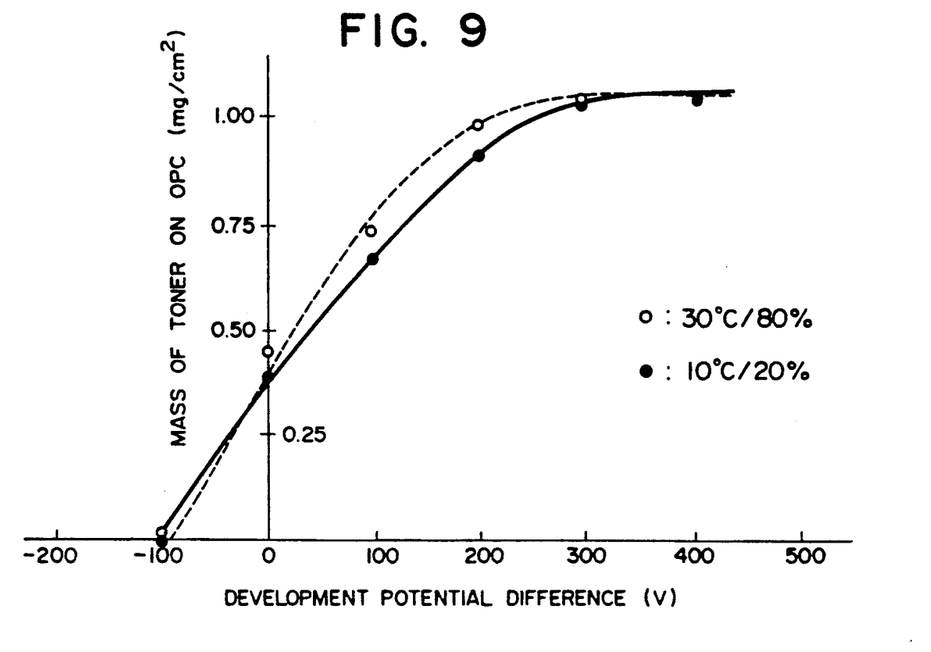

Using the above prepared development roller, the electric charge quantities of the toner were measured and the M-V characteristics were evaluated in the development performance test in the same manner as in Example 1. The results are shown in Table 5 and FIG. 9.

COMPARATIVE EXAMPLE 1

The procedure for preparation of the development roller employed in Example 1 was repeated except that the fluorosilicone polymer composition was replaced by a commercially available nitril-butadiene rubber (NBR), "220S" (Trademark), made by Nippon Zeon Co., Ltd., so that a comparative development roller No. 1 was obtained.

Figure 10:
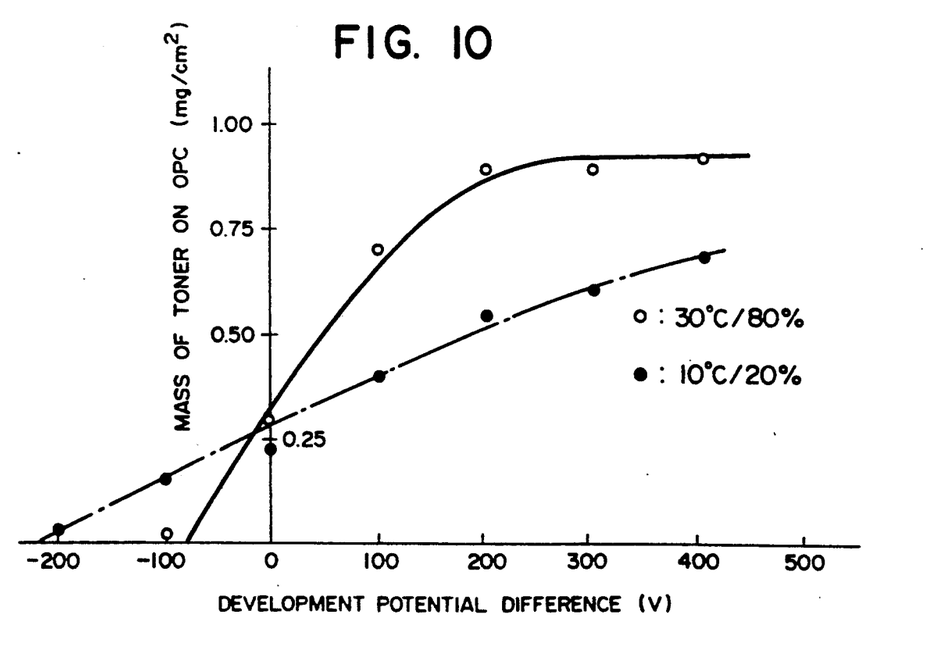
FIG. 10 is a graph showing the environmental resistance of a comparative development apparatus.

Using the above prepared comparative development roller, the electric charge quantities of the toner were measured and the M-V characteristics were evaluated in the development performance test in the same manner as in Example 1. The results are shown in Table 5 and FIG. 10.

TABLE 5

|  | Electric Charge Quantity (μC/g) | |
| --- | --- | --- |
|  | 10° C./20% RH | 30° C./80% RH |
| Example 1 | −8.5 | −7.1 |
| Example 2 | −9.3 | −9.6 |
| Example 3 | −12.0 | −13.4 |
| Example 4 | −11.5 | −12.9 |
| Example 5 | −8.0 | −9.5 |
| Example 6 | −9.8 | −10.3 |
| Example 7 | −8.7 | −9.6 |
| Comparative Example 1 | −13.1 | −7.6 |

As can be seen from the results shown in Table 5 and FIGS. 3 to 10, the development apparatus including the development roller according to the present invention shows excellent environmental resistance.

WHAT IS CLAIMED IS:

1. In a development apparatus comprising a development roller for developing a latent electrostatic image formed on an electrophotographic photoconductor to a visible toner image by applying a non-magnetic one-component toner thereto, the improvement wherein said development roller comprises a surface layer comprising a fluorosilicone polymer including repeating units of formula (I):

$$\begin{matrix} & CH_2-CH_2-CF_3 \\ & | \\ \text{⊦} & Si-O \text{⊦} \\ & | \\ & CH_3 \end{matrix} \quad (I)$$

2. The development apparatus as claimed in claim 1, wherein said surface layer of said development roller further comprises a fluorine-containing surface active agent which comprises a fluorine compound including a fluoroalkyl group.

3. The development apparatus as claimed in claim 2, wherein said fluorine compound is a compound having formula:

$$C_nF_{2n+1}OH$$

wherein n is an integer of 4 to 16.

4. The development apparatus as claimed in claim 2, wherein said fluorine compound is a compound having formula:

$$C_nF_{2n+1}SO_2NH \\ | \\ R^1$$

wherein n is an integer of 4 to 16, and $R^1$ is an alkyl group having 1 to 5 carbon atoms.

5. The development apparatus as claimed in claim 2, wherein said fluorine compound is a compound having formula:

$$C_nF_{2n+1}CONH \\ | \\ R^1$$

wherein n is an integer of 4 to 16, and $R^1$ is an alkyl group having 1 to 5 carbon atoms.

6. The development apparatus as claimed in claim 2, wherein said fluorine-containing surface active agent is in an amount of 0.1 to 10 parts by weight to 100 parts by weight of said fluorosilicone polymer.

7. The development apparatus as claimed in claim 1, wherein said surface layer of said development roller further comprises a fluorine-containing surface active agent which comprises an alkylene-oxide-addition fluorine compound.

8. The development apparatus as claimed in claim 7, wherein said alkylene-oxide-addition fluorine compound is a compound having formula:

$$C_nF_{2n+1}O(R^1O)_m H$$

wherein n is an integer of 4 to 16, m is an integer of 2 to 30, and $R^1$ is an alkylene group having 1 to 5 carbon atoms.

9. The development apparatus as claimed in claim 7, wherein said alkylene-oxide-addition fluorine compound is a compound having formula:

$$C_nF_{2n+1}SO_2N(R^1O)_m H \\ | \\ R^2$$

wherein n is an integer of 4 to 16, m is an integer of 2 to 30, $R^1$ is an alkylene group having 1 to 5 carbon atoms, and $R^2$ is an alkyl group having 1 to 5 carbon atoms.

10. The development apparatus as claimed in claim 7, wherein said alkylene-oxide-addition fluorine compound is a compound having formula:

$$C_nF_{2n+1}CON(R^1O)_m H \\ | \\ R^2$$

wherein n is an integer of 4 to 16, m is an integer of 2 to 30, $R^1$ is an alkylene group having 1 to 5 carbon atoms, and $R^2$ is an alkyl group having 1 to 5 carbon atoms.

11. The development apparatus as claimed in claim 7, wherein said fluorine-containing surface active agent is in an amount of 0.1 to 10 parts by weight to 100 parts by weight of said fluorosilicone polymer.

12. The development apparatus as claimed in claim 1, wherein said surface layer of said development roller further comprises a silicone polymer in an amount of 10 parts by weight or less to 90 parts by weight of said fluorosilicone polymer.

13. The development apparatus as claimed in claim 12, wherein said silicone polymer is selected from the group consisting of dimethyl silicone polymer, methylvinyl silicone copolymer and phenyl silicone polymer.

14. A development roller for developing latent electrostatic images formed on an electrophotographic photoconductor, comprising a surface layer and a core member for supporting said surface layer thereon, said surface layer comprising a fluorosilicone polymer including repeating units of formula (I):

$$\begin{matrix} & CH_2-CH_2-CF_3 \\ & | \\ \text{⊦} & Si-O \text{⊦} \\ & | \\ & CH_3 \end{matrix} \quad (I)$$

15. The development roller as claimed in claim 14, wherein said surface layer further comprises a fluorine-containing surface active agent which comprises a fluorine compound including a fluoroalkyl group.

16. The development roller as claimed in claim 15, wherein said fluorine compound is a compound having formula:

$$C_nF_{2n+1}OH$$

wherein n is an integer of 4 to 16.

17. The development roller as claimed in claim 15, wherein said fluorine compound is a compound having formula:

$$C_nF_{2n+1}SO_2NH$$
$$|$$
$$R^1$$

wherein n is an integer of 4 to 16, and $R^1$ is an alkyl group having 1 to 5 carbon atoms.

18. The development roller as claimed in claim 15, wherein said fluorine compound is a compound having formula:

$$C_nF_{2n+1}CONH$$
$$|$$
$$R^1$$

wherein n is an integer of 4 to 16, and $R^1$ is an alkyl group having 1 to 5 carbon atoms.

19. The development roller as claimed in claim 15, wherein said fluorine-containing surface active agent is in an amount of 0.1 to 10 parts by weight to 100 parts by weight of said fluorosilicone polymer.

20. The development roller as claimed in claim 14, wherein said surface layer of said development roller further comprises a fluorine-containing surface active agent which comprises an alkylene-oxide-addition fluorine compound.

21. The development roller as claimed in claim 20, wherein said alkylene-oxide-addition fluorine compound is a compound having formula:

$$C_nF_{2n+1}O(R^1O)_m H$$

wherein n is an integer of 4 to 16, m is an integer of 2 to 30, and $R^1$ is an alkylene group having 1 to 5 carbon atoms.

22. The development roller as claimed in claim 20, wherein said alkylene-oxide-addition fluorine compound is a compound having formula:

$$C_nF_{2n+1}SO_2N(R^1O)_m H$$
$$|$$
$$R^2$$

wherein n is an integer of 4 to 16, m is an integer of 2 to 30, $R^1$ is an alkylene group having 1 to 5 carbon atoms, and $R^2$ is an alkyl group having 1 to 5 carbon atoms.

23. The development roller as claimed in claim 20, wherein said alkylene-oxide-addition fluorine compound is a compound having formula:

$$C_nF_{2n+1}CON(R^1O)_m H$$
$$|$$
$$R^2$$

wherein n is an integer of 4 to 16, m is an integer of 2 to 30, $R^1$ is an alkylene group having 1 to 5 carbon atoms, and $R^2$ is an alkyl group having 1 to 5 carbon atoms.

24. The development roller as claimed in claim 20, wherein said fluorine-containing surface active agent is in an amount of 0.1 to 10 parts by weight to 100 parts by weight of said fluorosilicone polymer.

25. The development roller as claimed in claim 14, wherein said surface layer of said development roller further comprises a silicone polymer in an amount of 10 parts by weight or less to 90 parts by weight of said fluorosilicone polymer.

26. The development roller as claimed in claim 25, wherein said silicone polymer is selected from the group consisting of dimethyl silicone polymer, methylvinyl silicone copolymer and phenyl silicone polymer.

27. The development roller as claimed in claim 14, further comprising an electroconductive elastic layer on said core member.

28. The development roller as claimed in claim 14, further comprising an outer layer on said surface layer.

29. The development roller as claimed in claim 27, further comprising an outer layer on said surface layer.

* * * * *